E. C. MELLICK.
POULTRY WATERER.
APPLICATION FILED JUNE 22, 1920.

1,401,424.

Patented Dec. 27, 1921.
2 SHEETS—SHEET 1.

E. C. Mellick INVENTOR

BY Victor J. Evans ATTORNEY

WITNESS:

E. C. MELLICK.
POULTRY WATERER.
APPLICATION FILED JUNE 22, 1920.

1,401,424.

Patented Dec. 27, 1921.
2 SHEETS—SHEET 2.

WITNESS:
L. B. James

E. C. Mellick  INVENTOR
BY Victor J. Evans  ATTORNEY

UNITED STATES PATENT OFFICE.

EDWIN C. MELLICK, OF FORMOSO, KANSAS.

POULTRY-WATERER.

1,401,424.  Specification of Letters Patent.  Patented Dec. 27, 1921.

Application filed June 22, 1920. Serial No. 390,894.

*To all whom it may concern:*

Be it known that I, EDWIN C. MELLICK, residing at Formoso, in the county of Jewell and State of Kansas, have invented new and useful Improvements in Poultry-Waterers, of which the following is a specification.

This invention relates to a poultry trough designed to imitate the "open trough type" yet adding such novel features as to render it much more efficient.

One feature is the provision of a trough that shall be mounted upon legs the purpose of which is to remove the trough from the filth and litter of the floor. This feature also eliminates the use of any of the floor space so much needed by the poultry.

Another feature is the provision of a trough that shall be mounted upon legs and surrounded by a horizontal platform the purpose of which is to provide a standing place for the poultry while in the act of drinking. This platform shall be spaced from the trough to admit a passage way for dirt that might otherwise lodge on the platform.

Another feature is the provision of a trough that shall have its top edges notched, forming sharp points, the purpose of which is to prevent the poultry from standing upon the edges of the trough and thus polluting the water with dirt from the feet and their droppings.

Another feature is the provision of a trough that shall be divided into two equal compartments, the purpose of which is to provide a place for pouring two kinds of liquids, water and milk, for example, into the trough at the same time.

Another feature is the provision of a trough that is easily filled and emptied. The liquids are poured into the trough in the same manner as into the ordinary trough and each compartment is provided with an opening at the bottom which are normally closed with plugs. To empty trough one simply removes the plugs and the liquid is drained off. By draining the liquid into a pail the liquid does not run upon the floor thus making the floor damp.

Another feature is the provision of means for heating the contents of the trough so the temperature of said contents may be kept at a proper degree for poultry in extreme cold or freezing weather.

The very nature of the trough provides for a very healthful exercise for the poultry as they fly up and down from the trough.

With the above and other objects in view the invention includes the following novel features and details of construction, to be hereinafter more fully described, illustrated in the accompanying drawings and pointed out in the appended claims.

In the drawings:—

Figure 1:
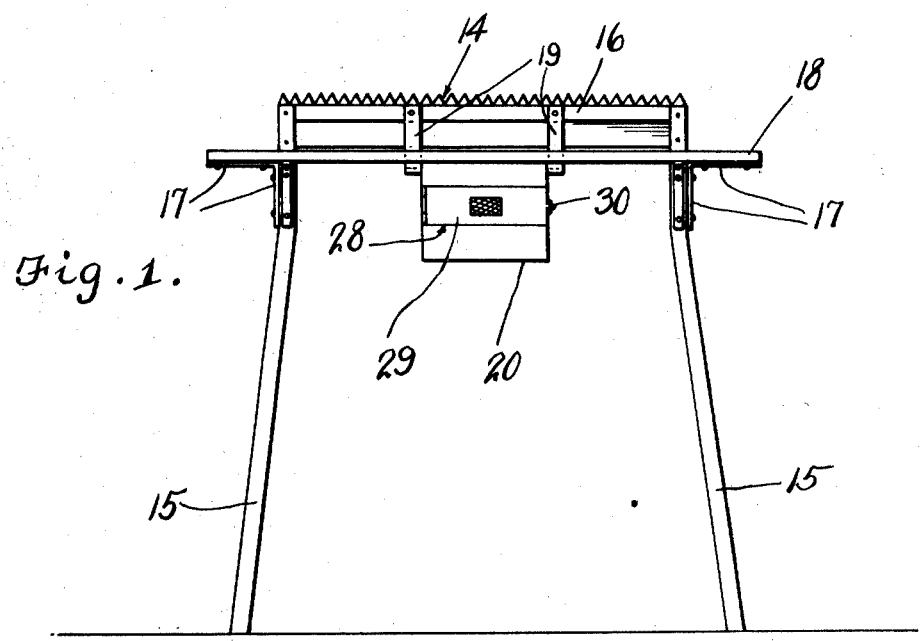
Figure 1 is a side elevation of a watering trough embodying the present invention.
Figure 2:
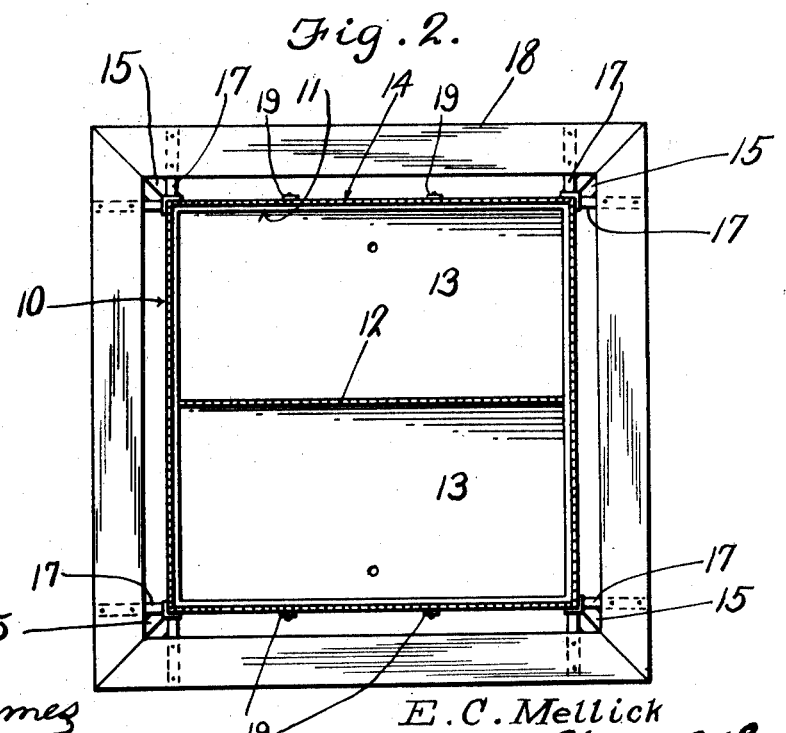
Fig. 2 is a top plan view of the same.
Figure 3:
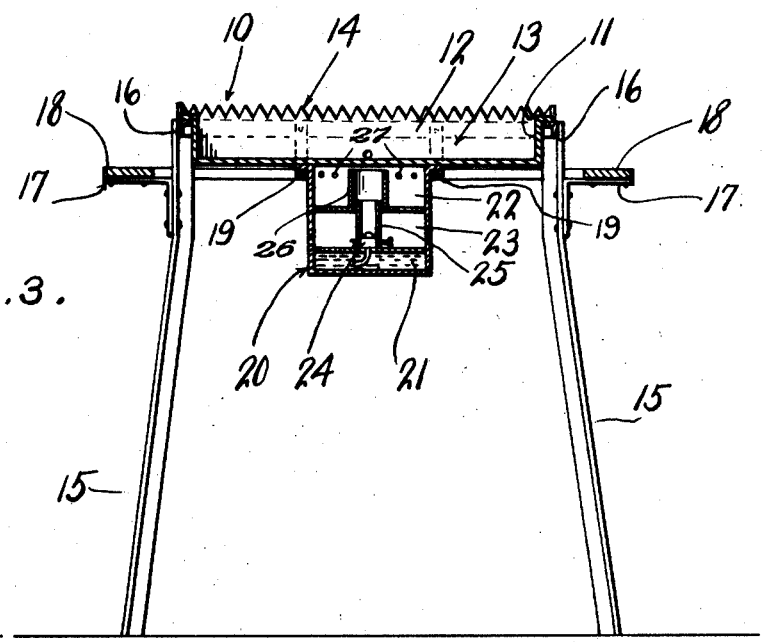
Fig. 3 is a central vertical section.
Figure 4:
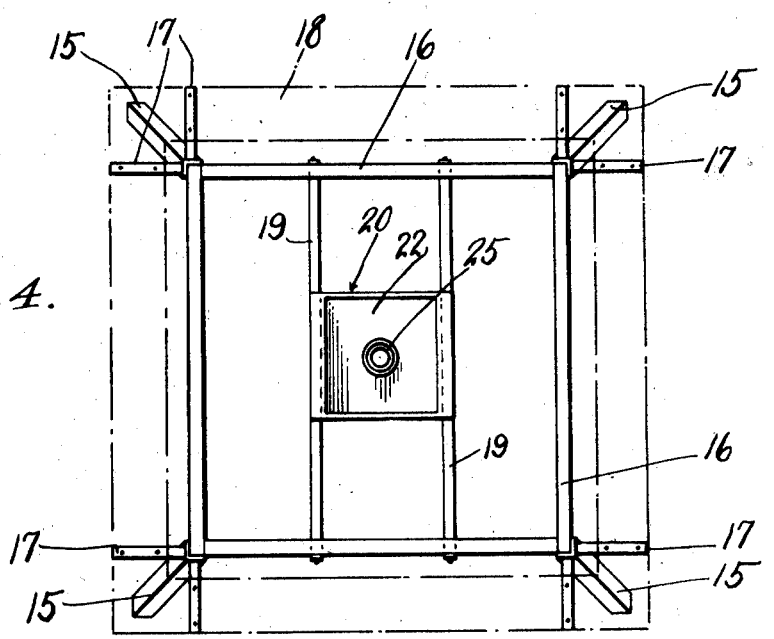
Fig. 4 is a top plan view with the trough omitted.

Referring specifically to the drawings, wherein like characters of reference denote corresponding parts, the trough which is preferably constructed of galvanized sheet metal comprises a bottom 10 and sides 11. This forms a rectangular receptacle which is preferably divided by a partition 12 so as to form separate compartments 13, one of which may contain water and the other milk, or both compartments may contain the same liquid as desired. The upper edges of the side wall of the trough 11 and the partition 12 are of irregular formation and thus provide sharp points 14 which extend upward so as to prevent the poultry from standing upon these edges and thus polluting the contents of the trough. It further prevents the poultry from getting their feet wet.

The trough is supported upon legs 15 which are preferably constructed of angle iron. The upper ends of these legs are joined securely by a frame 16. The legs bend outwardly just below the braces 17, to provide a firm support for the trough.

Surrounding the trough is a horizontal platform 18 whose inner edges are spaced from the sides of the trough to provide a passageway for any dirt that might be deposited upon the platform from the feet of the poultry. The said platform is secured to the trough by means of the outwardly extending braces 17. This means of securing the platform to the trough at the same time serves to brace the legs 15 giving them more firmness.

Strips of iron 19 are fastened to the bar 16 and extend beneath the trough. Mounted upon the strips 19 is a metal casing 20 which is formed at its bottom with a fuel chamber 21 and at its top with a heat chamber 22, while located intermediate these chambers is a lamp compartment 23. This lamp compartment has located therein a lamp 24 which receives its fuel from the fuel chamber 21, while the chimney of the lamp, which is indicated at 25 extends upward through an opening, just large enough to admit it, into the heat chamber. Within this heat chamber is a cylinder 26 which just fits over the opening for admitting the chimney. This cylinder is spaced from the bottom of the trough to permit the gases to escape from the lamp. The apertures 27 in top edges of the heat chamber are also spaced from the bottom of the trough to allow the said gases to escape into the air.

The casing 20 is provided with an opening 28 which is closed by a door 29, the latter being hingedly secured to the casing and provided with a novel latchet 30 to retain it in a closed position. This door 29 is provided with an opening covered over with screened wire, the purpose of which is to exclude foreign matter from the lamp, to admit air to the lamp and to allow the operator to observe the lamp without opening the door. The chimney of said lamp is also provided with an opening on the side, covered with mica, to provide a means for observing the flame of the lamp. Thus the operator may observe the flame of the lamp from without by simply looking through the opening in the door and through the opening of the chimney. An opening is provided in the fuel chamber which admits a place for filling the chamber. This opening is closed by means of a screw top.

By locating the above described heating device at the central portion of the trough the contents of both compartments 13 are heated and kept at the desired temperature.

The invention is susceptible of various changes in its form, proportions and minor details of construction and the right is herein reserved to make such changes as properly fall within the scope of the appended claims.

Having described the invention what is claimed is:—

1. A device of the class described comprising a trough, a pair of metallic strips secured upon opposite sides of said trough and extending beneath the same, a metallic casing carried by said strips and having a plurality of openings therein adjacent the upper edges thereof, a fuel chamber disposed in said casing, a lamp extending from said fuel chamber, a heat chamber disposed in said casing above said fuel chamber, a chimney surrounding the upper end of said lamp and extending into said heat chamber, and a cylinder surrounding the upper end of said chimney and terminating short of the bottom of said trough.

2. A device of the class described comprising a trough, a pair of metallic strips secured upon opposite sides of said trough and extending beneath the same, a metallic casing carried by said strips and having an opening in one side thereof, means for closing said opening, a fuel chamber disposed in said casing, a lamp extending from said fuel chamber, a heat chamber disposed in said casing above said fuel chamber and having a plurality of openings therein, a chimney surrounding the upper end of said lamp, extending into said heat chamber said heat chamber having an opening formed therein, and a cylinder surrounding the upper end of said chimney and terminating short of the bottom of said trough.

In testimony whereof I affix my signature.

EDWIN C. MELLICK.